Patented Jan. 14, 1964

3,117,854
DEFOLIATION OF PLANTS EMPLOYING ALKANOL AMINE ESTERS OF DIPHENYLBORINIC ACIDS
Joseph B. Skaptason, Grandview, Mo., assignor to Minnesota Mining and Manufacturing Company, St. Paul, Minn., a corporation of Delaware
No Drawing. Filed Apr. 26, 1961, Ser. No. 105,536
10 Claims. (Cl. 71—2.6)

This invention relates to the treatment of plants and more particularly to the defoliation of various plants.

Processes for defoliating certain plants including, among others, cotton and soybeans, are of great utility in agriculture, particularly with the increased use of mechanical pickers and harvesters. The defoliation of certain crops is in fact an economic necessity when they are mechanically harvested since defoliated plants are free from leaves which would otherwise tend to clog mechanical harvesting equipment and add to the trash in the portion of the plant being harvested. Also, mechanical harvesting equipment can be more exactly positioned with respect to the plants to be harvested in fields in which the plants have been defoliated since the plants are not obscured by leaves. Although the defoliation of various plants which are to be harvested by hand is somewhat less essential than if they are to be mechanically harvested, fields which are to be harvested by hand are also commonly defoliated. The removal of the leaves prior to hand picking cotton, for example, renders it easier and more comfortable to pick and the picking can be accomplished more quickly.

Furthermore, defoliation offers advantages in certain crops which are not directly connected with the harvesting process. Thus, for example, in the defoliation of cotton, the resultant increased exposure to sun and the drying action of the air movement through the defoliated field causes the mature cotton bolls to open more quickly. Boll rot and seed and fiber deterioration in the field and subsequent staining of the cotton caused by crushed leaves are all reduced.

A number of compositions have been used heretofore in the defoliation of cotton, soybeans and other plants. The mechanism of action of most such defoliants has involved the caustic and/or desiccating action of the chemical which dries up the leaf without causing it to drop free of the petiole. Such defoliants do not operate quickly and cleanly, since the passage of a substantial amount of time is required before all of the leaves are finally broken from the plants. In addition the plants themselves are embrittled and are therefore more difficult to harvest.

The defoliants of the present invention appear to operate in a completely different way. Although the mechanism is not completely understood, it appears that their action is due primarily to a hormone-type activity which actually induces the plant to form a corky layer at the abscission point of the petiole structure which in turn causes the leaf to drop from the petiole. This relatively rapid and localized action often appears not to otherwise affect the plant, the leaves which fall to the ground being substantially undamaged while the remainder of the plant continues to live. The defoliation occurs relatively rapidly, e.g. sometimes within 24 hours after application of the defoliant. Furthermore, regrowth of foliage after defoliation appears to be suppressed in many instances.

It is therefore an object of the present invention to provide a new and valuable class of plant defoliants. It is a further object of the present invention to provide a new and improved process for the removal of foliage from plants. It is a still further object of the invention to provide a novel class of defoliants which act quickly and effectively but with no substantial secondary damage to the plant. Other objects will become evident from the disclosure which follows.

In accordance with the above and other objects of this invention it has been discovered that cotton, beans and other plants may be defoliated by the application thereto in low concentration of a defoliant composition comprising an alkanol amine ester of a diphenylborinic acid together with a surface active agent. Ordinarily these constituents are blended with an extending agent or agents together, if desired, with other adjuvants such as buffers, stickers, thickening agents, etc. to form concentrates which are diluted with water to the desired strength just before use. Particularly suitable concentrates include solutions of the esters and surface active agents in organic solvents such as acetone, methanol, tetrachloroethane, methylchloroform, methylene chloride, chloroform, and mixtures thereof, etc., and wettable powders comprising blends of pigments (e.g. hydrated silica, salts, diatomaceous earth, etc.) together with the esters and surface active agents. In addition, in certain cases it may also be desirable to add other materials known to have defoliant and/or desiccant activity, e.g. pentachlorophenol, aminotriazole, etc.

The active defoliating agents in these compositions are the alkanolamine esters of diphenylborinic acids. The essential moiety in these esters with respect to the defoliant properties thereof is believed to be:

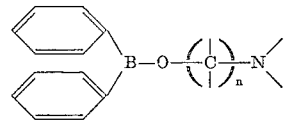

wherein $n$ is preferably 2 or 3. A variety of groups may apparently be carried by this structure without altering its essential character as a defoliating agent, although they do bring about variations of the solubility of the esters in particular solvents and in the level of their defoliating activity against specific plants. Thus the phenyls may carry various substituent groups, the open carbon bonds in the foregoing structure may be individually satisfied by hydrogen atoms or lower alkyl groups (e.g. up to about four carbon atoms in length) and the open nitrogen bonds therein may be satisfied individually by hydrogen atoms or hydrocarbon groups.

The terms "a diphenylborinic acid" and "diphenylborinic acids" herein are intended to include those which carry substituents on the phenyls. Thus, in addition to diphenylborinic acid itself, the following are included: alkyl-substituted diphenylborinic acids such as di(4-methylphenyl) borinic acid, di(2,4-dimethylphenyl) borinic acid, di(4-ethylphenyl) borinic acid, di(4-butylphenyl) borinic acid, di(2,4-diethylphenyl) borinic acid and di(2,4,6-trimethylphenyl) borinic acid; alkoxy-substituted diphenylborinic acids such as diphenylborinic acid, di(4-methoxyphenyl) borinic acid, di(3-methoxyphenyl) borinic acid, di(2-methoxyphenyl) borinic acid, di(4-ethoxyphenyl) borinic acid and di(4-butoxyphenyl) borinic acid; aryl-substituted diphenylborinic acids such as di(4-bisphenyl) borinic acid and di(2-bisphenyl) borinic acid; halo-substituted diphenylborinic acids such as di(3-chlorophenyl) borinic acid, di(4-bromophenyl) borinic acid, di(3-trifluoromethylphenyl) borinic acid and di(2-bromo-4-trifluoromethylphenyl) borinic acid; etc. The alkanol amine esters of the unsubstituted diphenylborinic acid form a particularly preferred group within the invention since they are readily prepared from the easily accessible starting compounds chlorobenzene and bromobenzene and, when mixed with surface active agents and otherwise suitably compounded, form highly effective defoliants.

Among the alkanol amines which react with the diphenylborinic acids to form esters suitable for use in the defoliant compositions of the invention are, for example, ethanolamine, N-methylethanolamine, N-ethylethanolamine, N,N-dimethylethanolamine, N,N-diethylethanolamine, N,N-dibutylethanolamine, 2-amino-1-methyl ethanol, 2-dimethylamino-1-methylethanol, 2-amino-1,2-dimethyl propanol, 2-amino-2-methylpropanol, N-(1-phenylethyl) ethanolamine, propanol amine, 2-butylamino-2,2-dimethylethanol, 2-ethylamino-2,2-dimethylethanol, 2-propylamino-2,2-dimethylethanol, 2-cyclohexylamino-2,2-dimethylethanol, 2-diethylaminopropanol, 3-diethylaminopropanol, 2-butylethylaminopropanol, etc.

The alkanolamine esters of diarylborinic acids are, broadly speaking, known compositions of matter which can be prepared by methods disclosed in the Journal of the American Chemical Society, vol. 77, p. 2491, ff. (1955), and Annalen, vol. 619, pp. 28–35 (1958). Thus the alkanol amine esters of diphenylborinic acid can be prepared, for example, by the reaction of a metallic derivative of bromo-benzene such as phenyl magnesium bromide with butyl borate at low temperature, the precipitation of butyl diphenylborinate as a complex with ammonia by bubbling ammonia gas through the reaction mixture and the reaction of the ammonia complex with an alkanol amine to form the corresponding diphenylborinic acid-alkanol amine ester. Esters of substituted diphenylborinic acids are prepared in a similar manner, the metallic derivative chosen determining the acid portion of the product (e.g. esters of diphenylborinic acid can be prepared from phenyl magnesium bromide, esters of di(4-methoxy phenyl) borinic acid can be prepared from 4-methoxyphenyl magnesium bromide, esters of di(3-chlorophenyl) borinic acid, can be prepared from 3-chlorophenyl magnesium iodide, esters of di(p-bisphenyl) borinic acid can be prepared from 4-bisphenyl magnesium iodide, etc.) and the alkanol amine which is reacted with the butyl diphenylborinate complex with ammonia determines that portion of the product.

The following descriptions, including uncorrected melting points where available, of a number of these esters will serve to characterize them and are generally illustrative of the esters of the invention.

| Diphenylborinic acid esters of: | M.P. or appearance |
|---|---|
| Ethanolamine | 185–189° |
| N-methylethanolamine | 193–195° |
| N-ethylethanolamine | 188–190° |
| N,N-dimethylethanolamine | 164–166° |
| N,N-diethylethanolamine | Oil |
| 2-amino-1-methyl ethanol | 180–182° |
| N,N-dibutylethanolamine | Oil |
| 2-amino-1,2-dimethyl propanol | 157–160° |
| 2-amino-2-methyl propanol | 196–200° |
| N-(1-phenylethyl) ethanolamine | 158–160° |
| Propanolamine | 186–190° |

Similar data with respect to esters of other diphenyl borinic acids are as follows:

| Ester: | M.P. or appearance |
|---|---|
| 2-amino-2-methyl propanol ester of di(4-fluorophenyl) borinic acid | 227–228° C. |
| Ethanol amine ester of di(4-fluorophenyl) borinic acid | 240–241° C. |
| Ethanol amine ester of di(4-methylphenyl) borinic acid | White, crystalline. |
| 2-amino-2-methyl propanol ester of di(4-methylphenyl) borinic acid | 212–213° C. |
| N,N-dimethylethanol amine ester of di(4-fluorophenyl) borinic acid | White, crystalline. |
| N,N-dimethylethanol amine ester of di(4-chlorophenyl) borinic acid | White, crystalline. |

As previously noted, the defoliant concentrates also contain a surface active agent. This constituent causes the liquid defoliant composition applied to the plant to spread on the leaves rather than gathering into drops, thus providing a much larger area of contact and, in addition, tending to insure that the defoliant will remain on the plant rather than running off of or being shaken from the plant. Further, in the organic solvent solution type of defoliant concentrate, the surface active agent provides for improved miscibility between the solvent and the ester while in the wettable powder type of concentrate it provides the wettability which enables the concentrate to be easily diluted for use. Both ionic and non-ionic surface active agents are operable in the present invention, e.g. including the condensate of ethylene oxide with a hydrophobic base formed by condensing propylene oxide with propylene glycol having a molecular weight of 2,000 (marketed under the trade designation "Pluronic L–61" by the Wyandotte Chemicals Corporation of Wyandotte, Michigan); isooctyl phenyl polyethoxyethanol (marketed under the trade designation "Triton X–100" by the Rohm and Haas Company); an alkyl aryl polyether alcohol (marketed under the trade designation "Triton B–1956" by the Rohm and Haas Company); a blend of alkyl aryl polyether alcohols with organic sulfonates (marketed under the trade designation "Triton X–151" by the Rohm and Haas Company); the sodium salt of an alkyl aryl polyether sulfonate (marketed under the trade designation "Triton X–200" by the Rohm and Haas Company); the sodium sulfate derivative of 7-ethyl-2-methylundecanol-4 (marketed under the trade designation "Tergitol 4" by the Carbide and Carbon Chemicals Company); an acylamidoisopropyl hemi-ester of the sodium salt of sulfosuccinic acid of the formula:

$$CH_3(CH_2)_xCO-NHCH_2CH(CH_3)OCOCH(SO_3Na)(CH_2COONa)$$

wherein $x$ is a number of average value about 12, (marketed under the trade designation "Emcol K–8300" by the Emulsol Chemical Corporation, a division of the Witco Chemical Co.); sodium lauryl sulfate; dodecyl amine hydrochloride; etc.

The defoliant compositions are effective in relatively small amounts, i.e. usually about 0.1 to 25 pounds per acre of plants, and preferably 0.5 to 5 pounds of the ester per acre of plants, being sufficient to cause defoliation. The exact level of effectiveness of a particular ester with respect to any plant cannot be extrapolated with assurance to others although it is clear that they are generally effective as defoliants. The amount of any one ester actually needed will depend upon such factors as the kind of plants to be defoliated, the maturity of the plants, general atmospheric conditions, condition of the soil, and other factors which affect resistivity to defoliation. The surface active agent content of the defoliant composition usually amounts to not less than about 0.05 pound per acre nor more than 20 pounds per acre and preferably from 0.1 to 5 pounds per acre. Smaller amounts of surface active agents are not ordinarily effective and there is no advantage to using larger amounts, although it is possible to use any amount of surface active agent up to a quantity which would be detrimental to the plant being treated.

Preferably, the defoliant compositions will contain from about 10 to 90 parts by weight of the surface active agent and from about 90 to 10 parts by weight of the ester, with solvents, extending agents and other adjuvants added thereto. The total volume of the liquid mixture used is not of critical importance provided the proper amount of ester is applied to the plants. The manner in which the solution is sprayed upon the plants generally determines the amount used. Ordinarily, the surface of the plants should be covered, but there should be no run off. The dilute mixtures are readily applied by any of the conventional means as, for example, dusting, spraying, drenching, etc.

The following examples illustrate methods and compositions used in practicing this invention, but are not to be construed as limiting the scope thereof with regard to the specific esters and surface active agents to be employed, the plants to be defoliated or the methods described for application of the compositions to the plants. Likewise, the particular formulations utilized in these examples are merely exemplary, since it is within the skill of the art to prepare further formulations consisting of defoliant vehicles incorporating alkanolamine esters of diphenylborinic acids and surface active agents as herein disclosed. All parts are given on a weight/volume basis (e.g., milligrams/liter) unless otherwise specified.

EXAMPLE 1

Bean Defoliant Activity—Greenhouse Tests

Red kidney bean seeds are planted in vermiculite in 4 inch square plastic pots at a density of five to six per pot and are watered and fertilized by sub-irrigation during their growth period. This provides a continuous supply of bean plants grown under nearly identical conditions to a comparable state of development and size at the time of testing (normally between the tenth and twelfth days after planting). At this time the catyledonary leaves are well-developed and the first set of trifoliate leaves are just emerging from the apical meristem. Just prior to the test the plants are thinned to a stand of 3 plants per pot.

The concentrate formulation used for these tests is a solution of 84 parts of acetone, 5 parts of "Triton X–151" and 11 parts of the ester being tested. The plants are treated as follows: Each defoliant composition is applied to the plants in three pots (i.e. nine individual plants). The three pots are placed equidistant from one another on a precision turntable for spraying. This turntable is designed to turn at ten revolutions per minute and at the same time to rotate the pots with respect to the turntable itself in such a way that the plants in each pot receive a substantially uniform spray on all sides from a stationary spray nozzle. A total of 30 milliliters of liquid defoliant composition (which is prepared by diluting the concentrate formulation with water) is applied to the plants in the pots using a spray atomizer nozzle which gives maximum coverage of the foliage without run off. The level of treatment of the plants in this test is thus determined by the degree of dilution of the 30 milliliters of defoliant composition applied. The concentration of the diphenylborinic acid-alkanol amine esters in the 30 milliliters of treating solution can be easily converted into the approximate level of treatment in pounds of ester per acre of bean (or cotton) plants in the field by expressing it in parts per million (weight/volume) and dividing this number by one thousand. Thus, for example, the level of treatment imparted to the plants in the greenhouse tests using 2,000 parts of ester per million parts of spray approximates that in field tests in which a total of two pounds of ester are applied to an acre of growing bean (or cotton) plants.

After spraying, the pots are isolated from one another sufficiently to avoid any contact until the spray deposit has dried, then returned to their growth area and held under normal high growing conditions for the duration of the observation. Normally, defoliation counts are made when defoliation is first noted and are carried on for a period of 7–10 days, depending upon the activity of the chemicals being evaluated. The results are reported as percent leaves dropped, i.e. percent defoliation.

The test data gathered in this way are as follows:

| Ester | Concentration of Treatment (Parts ester per million parts spray) | Percent Defoliation |
|---|---|---|
| N,N-dimethylethanolamine ester of diphenylborinic acid | 2,000 | 100 |
| Same | 1,000 | 100 |
| N,N-dimethylethanolamine ester of di(4-chlorophenyl) borinic acid | 2,000 | 100 |
| Same | 1,000 | 100 |
| Same | 500 | 65 |
| N,N-dimethylethanolamine ester of di(4-fluorophenyl) borinic acid | 2,000 | 100 |
| Same | 1,000 | 60 |

EXAMPLE 2

Cotton Defoliant Activity—Greenhouse Tests

Cotton seeds (variety Coker 100) are acid delinted and treated with a seed disinfectant and protectant and then planted in ordinary potting soil in 4 inch square plastic pots at a density of four to five per pot, and are watered and fertilized by sub-irrigation. After a growth period of 30 days the plants are thinned to a stand of three plants per pot and are then ready for testing. At this time the second and sometimes the third secondary leaves have emerged from the meristematic tissues.

Two types of concentrate formulations are used for these tests, i.e. the acetone solution concentrate as described in Example 1 and a wettable powder concentrate consisting of 46% of a hydrated silica pigment of extremely fine particle size (available under the trade designation "Hi-Sil 233" from the Columbia Southern Chemical Corp. of Pittsburgh, Pa.), 2% of a lignosulfonate dispersing agent (available under the trade designation "Marasperse N" from the Marathon Corp. of Rothschild, Wisc.), 2% of "Pluronic L–61" surface active agent and 50% of the diphenylborinic acid ester (these percentages being on a weight basis). The constituents are blended together in a ball mill and the resulting powder is diluted with water to the desired concentration prior to use. The procedure of Example 1 is usde to apply the materials to the plants.

The test data gathered in this way are as follows:

| Diphenyl borinic acid esters of the following— | Type of Concentrate Formulation | Concentration of Treatment (Parts ester per million parts spray) | Percent Defoliation |
|---|---|---|---|
| Ethanolamine | Wettable powder. | 4,000 | 47 |
| Same | Same | 2,000 | 30 |
| N,N-dimethylethanol amine. | Same | 2,000 | 100 |
| Same | Same | 1,000 | 100 |
| 2-amino-1,2-dimethyl propanol. | Same | 2,000 | 84 |
| N-methylethanolamine | Acetone solution. | 2,000 | 100 |
| N-ethylethanolamine | Same | 2,000 | 100 |
| N,N-dimethylethanolamine. | Same | 2,000 | 87 |
| 1-Methyl-2-(dimethylamino ethanol. | Same | 2,000 | 100 |
| N-(1-phenylethyl) ethanolamine. | Same | 2,000 | 100 |

Results of tests of wettable powder formulations of various esters of substituted diphenylborinic acids with with alkanol amines are as follows:

| Ester | Concentration of Treatment (Parts ester per million parts spray) | Percent Defoliation |
|---|---|---|
| Ethanolamine ester of di(4-methylphenyl) borinic acid | 2,000 | 100 |
| 2-Amino-2-methyl propanol ester of di(4-methylphenyl) borinic acid | 2,000 | 100 |
| Ethanol amine ester of di(4-fluorophenyl) borinic acid | 2,000 | 100 |
| 2-Amino-2-methyl propanol ester of di(4-fluorophenyl) borinic acid | 2,000 | 100 |

EXAMPLE 3

*Cotton Defoliant Activity—Field Tests*

The acetone solution and wettable powder test formulations described in the previous examples are also used in these tests.

The test field is divided into test plots one row wide and ten feet long (each containing approximately six or seven cotton plants). The defoliant formulations are diluted with water to obtain the most advantageous contact with the plants (ordinarily complete coverage without runoff) at the particular level of treatment desired and then sprayed onto the plants as uniformly as possible with a pressure sprayer (operating at a pressure of about 10 pounds per square inch). Each defoliant lot is sprayed on two or three separate test plots and several untreated control plots are left in the test field. The plants are then observed for defoliation, which ordinarily occurs from about two days to two weeks after the treatment. The following results are obtained from tests of the N,N-dimethylethanolamine ester of diphenylborinic acid.

| Type of Test Formulation | Level of Treatment (lbs. of ester per acre of plants) | Percent Defoliation |
|---|---|---|
| Wettable Powder | 5 | 65 |
| Same | 8 | 99 |
| Acetone solution | 5 | 85 |
| Same | 5 | 80 |

The terms and expressions which have been employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. The method of defoliating plants which comprises applying thereto in an amount sufficient to effect defoliation a material including as an active ingredient an alkanol amine ester of a diphenylborinic acid.

2. The method of defoliating cotton which comprises applying thereto in an amount sufficient to effect defoliation a material including as an active ingredient an alkanol amine ester of a diphenylborinic acid.

3. The method of defoliating plants which comprises applying thereto in an amount sufficient to effect defoliation a material including as an active ingredient an alkanol amine ester of diphenylborinic acid.

4. The method of defoliating plants which comprises applying thereto in an amount sufficient to effect defoliation a material including as an active ingredient an alkanol amine ester of a halo-substituted diphenylborinic acid.

5. The method of defoliating plants which comprises applying thereto in an amount sufficient to effect defoliation a material including as an active ingredient an alkanol amine ester of an alkyl-substituted diphenylborinic acid.

6. The method of defoliating plants which comprises applying thereto in an amount sufficient to effect defoliation a material including as an active ingredient an alkanol amine ester of di(4-chlorophenyl)borinic acid.

7. The method of defoliating plants which comprises applying thereto in an amount sufficient to effect defoliation a material including as an active ingredient an alkanol amine ester of di(4-methylphenyl)borinic acid.

8. The method of defoliating plants which comprises applying thereto in an amount sufficient to effect defoliation a material including as an active ingredient the N,N-dimethyl ethanolamine ester of diphenylborinic acid.

9. The method of harvesting a crop which comprises applying to the foliage of the crop plants an alkanol amine ester of a diphenylborinic acid at a rate of from about 0.1 to 25 pounds of said ester per acre of plants, whereby the foliage drops from the plants, and collecting the crop from the defoliated plants.

10. The method of harvesting cotton which comprises applying to the foliage of the cotton plants an alkanol amine ester of a diphenylborinic acid at a rate of from about 0.1 to 25 pounds of said ester per acre of the plants, whereby the foliage drops from the plants, and collecting the cotton.

References Cited in the file of this patent

FOREIGN PATENTS

| 215,097 | Australia | May 16, 1958 |
| 1,016,978 | Germany | Oct. 3, 1957 |

OTHER REFERENCES

Ahlgren et al.: Principles of Weed Control, copyright 1951, John Wiley & Sons Inc., page 268.